United States Patent
Hermann et al.

(10) Patent No.: US 10,442,476 B2
(45) Date of Patent: Oct. 15, 2019

(54) SPOILER SYSTEM FOR A VEHICLE

(71) Applicant: Dr. Ing. h.c. F. Porsche Aktiengesellschaft, Stuttgart (DE)

(72) Inventors: Felix Hermann, Leonberg (DE); Sebastian Collet, Leonberg (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 0 days.

(21) Appl. No.: 15/871,139

(22) Filed: Jan. 15, 2018

(65) Prior Publication Data
US 2018/0215422 A1    Aug. 2, 2018

(30) Foreign Application Priority Data
Jan. 27, 2017   (DE) .................. 10 2017 101 606

(51) Int. Cl.
*B62D 35/00* (2006.01)
*B62D 37/02* (2006.01)
*B60R 13/07* (2006.01)

(52) U.S. Cl.
CPC .............. *B62D 35/00* (2013.01); *B60R 13/07* (2013.01); *B62D 35/007* (2013.01); *B62D 37/02* (2013.01); *Y02T 10/82* (2013.01)

(58) Field of Classification Search
CPC ...... B62D 35/00; B62D 35/02; B62D 35/007; B62D 35/008; B62D 37/02; Y02T 10/82
USPC .......................................... 296/180.1–180.5
See application file for complete search history.

(56) References Cited

U.S. PATENT DOCUMENTS

| | | | | |
|---|---|---|---|---|
| 2,069,955 | A * | 2/1937 | Jackson | B60S 1/54 454/123 |
| 7,387,331 | B2 * | 6/2008 | Froeschle | B62D 35/007 296/180.5 |
| 8,033,593 | B2 * | 10/2011 | Ramin | B60Q 1/2619 296/180.1 |
| 2004/0124669 | A1 * | 7/2004 | Eynon | B60H 1/28 296/192 |
| 2009/0286461 | A1 * | 11/2009 | Molnar | B62D 35/007 454/152 |
| 2015/0274223 | A1 * | 10/2015 | Wolf | B62D 35/007 296/180.5 |

* cited by examiner

*Primary Examiner* — Dennis H Pedder
(74) *Attorney, Agent, or Firm* — Leydig, Voit & Mayer, Ltd.

(57) ABSTRACT

A spoiler system for a vehicle includes a spoiler body having a spoiler surface for influencing an air flow around the vehicle; and a spoiler receptacle having a sealing device with a seal configured to provide sealing between the sealing device and a sealing surface of the spoiler body during an extension movement of the spoiler body from a retracted position into an extended position. The spoiler body is movably mounted on the spoiler receptacle between the retracted position in which the spoiler body is received at least partially in the spoiler receptacle and the extended position in which the spoiler body is extended at least partially out of the spoiler receptacle.

12 Claims, 4 Drawing Sheets

SPOILER SYSTEM FOR A VEHICLE

CROSS REFERENCE TO RELATED APPLICATIONS

This application claims benefit to German Patent Application No. DE 10 2017 101 606.6, filed Jan. 27, 2017, which is hereby incorporated by reference herein.

FIELD

The present invention relates to a spoiler system for a vehicle and to a method for moving a spoiler body of a spoiler system.

BACKGROUND

It is known that vehicles should be equipped with spoiler systems in order to positively influence the air flow around the vehicle. Besides front spoilers, side spoilers or underfloor spoilers, rear spoilers are known in particular in this connection. It is also known that sports vehicles equip these spoiler systems with spoiler bodies which are movably mounted between different positions. This relates in particular to different driving situations or different speed situations. During normal driving operation, in order to improve the resistance value of the vehicle, the spoiler body can be brought into a retracted position in which it allows no or only a slight influencing of the air flow around the vehicle. If, however, relatively large downforces are desired, for example during rapid cornering, extended positions can be selected which allow different influencing possibilities for the air flow around the vehicle.

SUMMARY

In an embodiment, the present invention provides a spoiler system for a vehicle. The spoiler system includes a spoiler body having a spoiler surface for influencing an air flow around the vehicle; and a spoiler receptacle having a sealing device with a seal configured to provide sealing between the sealing device and a sealing surface of the spoiler body during an extension movement of the spoiler body from a retracted position into an extended position. The spoiler body is movably mounted on the spoiler receptacle between the retracted position in which the spoiler body is received at least partially in the spoiler receptacle and the extended position in which the spoiler body is extended at least partially out of the spoiler receptacle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
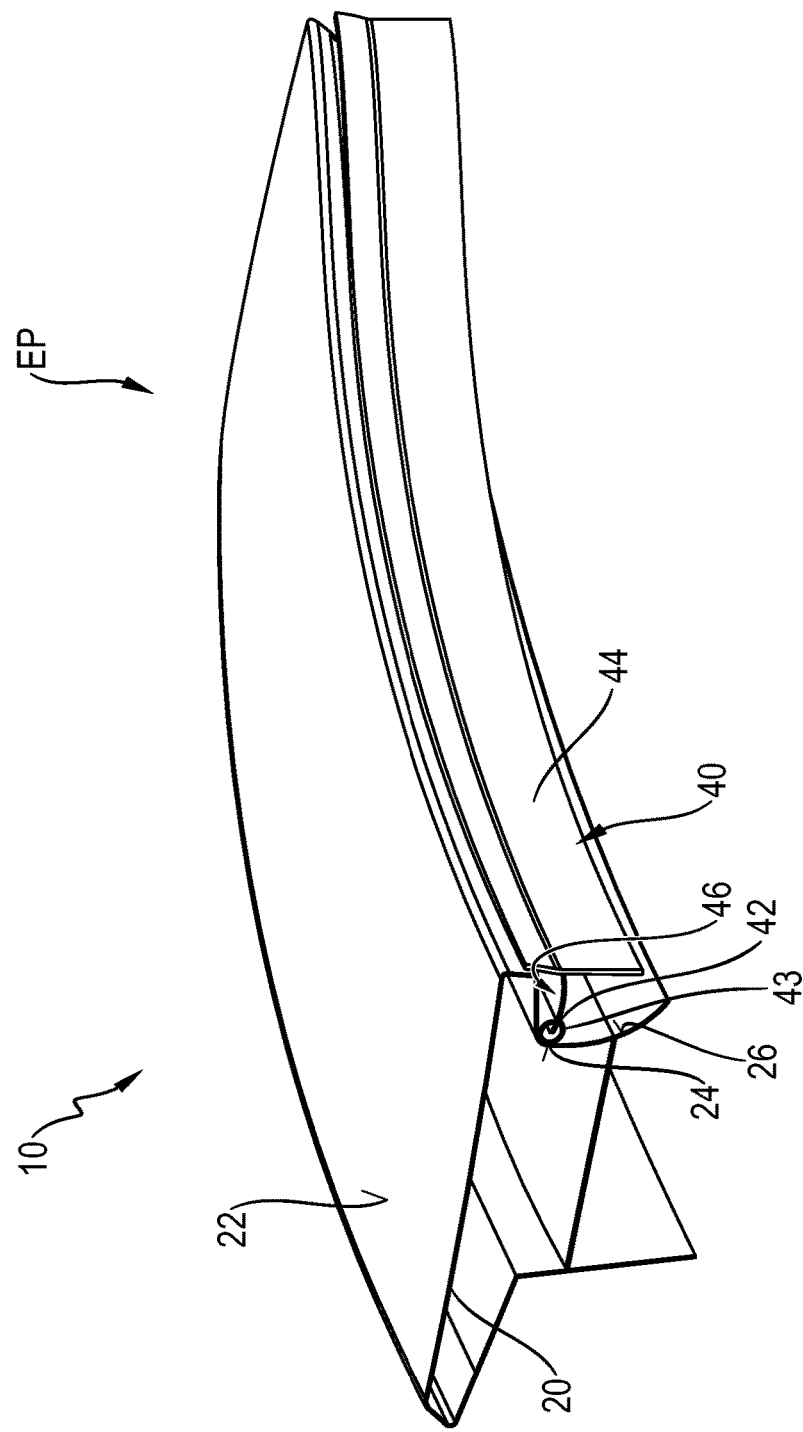
FIG. 1 shows a spoiler system according to an embodiment of the invention.

A disadvantage with the known solutions is that, in particular during the movement from the retracted position into at least one extended position, a gap is formed which opens between the spoiler body and a spoiler receptacle. The air flow around the vehicle can penetrate into this gap at least during the extension movement, with the result that flow which is disadvantageous at least during this extension movement negatively influences the air flow around the vehicle.

Embodiments of the present invention reduce or prevent underflow below the spoiler body during an extension movement in a cost-effective and simple manner.

According to an embodiment of the invention, a spoiler system for a vehicle is proposed which has a spoiler body with a spoiler surface for influencing an air flow around the vehicle. This spoiler body is movably mounted on a spoiler receptacle. The movable mounting allows an extension movement between a retracted position, in which the spoiler body is received at least partially in the spoiler receptacle, and at least one extended position, in which the spoiler body is extended at least partially out of the spoiler receptacle. Here, the spoiler receptacle has a sealing device with a sealing means for providing sealing between the sealing device and a sealing surface of the spoiler body during an extension movement of the spoiler body from the retracted position into the extended position.

A spoiler system according to an embodiment of the invention provides a spoiler body which, by means of a spoiler surface, can provide influencing of the air flow around the vehicle in the desired manner. What is particularly concerned here is a spoiler body which is part of a rear spoiler system of a vehicle. Here, the spoiler surface can be brought into different extended positions, at least one extended position constituting an influencing position in a desired manner for the air flow around the vehicle. At least one further position is a retracted position in which the air flow around the vehicle is influenced by the spoiler surface in another way or only in a slight manner. A retracted position is thus obtained in particular when the spoiler surface merges into the adjoining contour surfaces of the vehicle or into the adjoining sheet metal panel of the vehicle.

In the extension movement, the spoiler body can now be moved from the retracted position into the extended position. During this extension movement, there now exists the problem that at least part of the air flow around the vehicle enters a gap which opens between the spoiler body and the spoiler receptacle. In order to avoid this, a sealing device is provided in spoiler system configurations according to embodiments of the invention. This sealing device is equipped with a sealing means which is designed for providing sealing between the sealing device and a sealing surface of the spoiler body. Here, it is unimportant for the sealing in a first step in which way this sealing functionality is made available. Thus, it is conceivable in principle that, for the sealing functionality, the sealing means comes into planar, linear or some other contacting engagement with the sealing surface. However, other sealing solutions, as will be explained later with reference to a labyrinth functionality, can also be understood as a sealing device.

In this regard, the sealing functionality is ensured in particular or at least during the extension movement from the retracted position into the at least one extended position. However, it can be advantageous if, even on reaching the extended position, this sealing functionality is still maintained by means of the sealing device.

The sealing device provided according to embodiments of the invention now makes it possible to carry out an extension movement of the spoiler body from the retracted position into the extended position without air flow entering at least partially into a gaping gap between the spoiler body and spoiler receptacle. Rather, this gap is closed or sealed by the sealing device or the sealing means, with the result that air flow impinging there is deflected and substantially exclusively in this manner flows around the spoiler surface of the spoiler body.

Of course, it is also possible that the sealing functionality has the same sealing functionality also during the reverse movement, that is to say during the retraction movement from the extended position back into the retracted position. However, the technical functionality of the sealing is particularly provided with advantages in particular during the extension movement since it is precisely then that the desired positive influencing of the air flow around the vehicle is welcomed. In other words, during the extension movement, the vehicle now enters a situation in which positive influencing of the air flow is desired. In the reverse direction, that is to say during the retraction movement from the extended position into the retracted position, the sealing or the desired positive influencing of the air flow is considerably less critical since here the vehicle is moved from an extreme situation as it were back into a normal situation.

In embodiments of the present invention, the sealing device has a carrier part which is fixed to the vehicle body and which has in particular a water guide for discharging water. Such a sealing device in the form of a carrier part which is fixed to the vehicle body can here be formed separately from a basic component of the spoiler receptacle or else be an integral constituent part of said component. In embodiments of the invention, a water guide can have, in particular in cross section, a dish-shaped design which can receive and laterally discharge water which enters this region from the outside of the spoiler body. In other words, a rain gutter functionality as it were is ensured, this being formed in particular in the carrier part, which is fixed to the vehicle body, of such a sealing device. Of course, a part of the spoiler receptacle in the form of a wall can also correspond with this carrier part fixed to the vehicle body or serve as a fastening interface for fastening such a carrier part.

In embodiments of the present invention, the sealing means is connected in a form-fitting manner to a carrier part of the sealing device. Such a sealing means can in particular be applied subsequently to the carrier part. Here, this is preferably a carrier part fixed to the vehicle body, as has been explained in the preceding paragraph. Besides pure plugging-on, the form fit can also be made available by molding-on, for example by means of an injection-molding method. Here, the sealing means is in particular an embodiment with elastic material in order to be able to make available the desired sealing force as pressing force during direct contacting. Owing to the fact that a form-fitting fastening can be predetermined by the sealing means, subsequent sealing of already existing systems, that is to say as it were a retrofitting functionality, is also conceivable.

In embodiments of the present invention, the sealing means has a hollow-chamber profile at least in certain portions. In particular, this embodiment is also combined with an elastic material choice for the sealing means. A hollow-chamber profile for the sealing means allows a particularly simple and cost-effective production. Moreover, the sealing means becomes particularly light and can thus be equipped with a low weight by virtue of the hollow-chamber profiling. At the same time, a mechanical stability can be made available by means of which the desired sealing functionality can be made available in a targeted manner. Here, the sealing means can in particular have a sealing lip, as will be explained later.

In embodiments of the present invention, the sealing means has a sealing lip for sealingly contacting the sealing surface of the spoiler body during the extension movement. Such a sealing means with a sealing lip is thus provided for direct contacting of the sealing surface, this being in contrast to an embodiment of the present invention, as will be explained later, with the labyrinth functionality. Of course, this direct sealing contacting can also afford advantages during the already explained retraction movement. In particular, this contacting takes place with sliding contact during the extension movement. In other words, this means that the sealing lip bears constantly or substantially constantly against the associated sealing surface of the spoiler body at least over part of the extension movement. Such a sliding contact is associated in particular with the filling-out of a sliding surface, as will also be described in more detail later. The direct sealing contacting allows the functionality to be made available in a substantially completely sealing manner. Moreover, a defined sealing position is possible, with the result that this defined sealing position is assumed again and again for any desired repetition of the extension movement or an associated retraction movement or is followed again and again when running through the extension movement. Here, the sealing functions in particular also at a very wide range of flow velocities of the air flow, with the result that the sealing functionality is ensured both during simple or slow driving situations and at high speeds of the vehicle.

In embodiments of the present invention, the spoiler body has, adjoining the sealing surface, a sliding surface for the sealing lip to slide along during the extension movement. As has already been explained in the preceding paragraph, such a sliding surface can serve to make available the desired defined sealing position during the course of the extension movement. For sliding of the sealing lip, the sliding surface can have a corresponding surface functionality, for example be provided with a low-friction surface structure. Of course, guide portions, guide means or guide grooves are also conceivable in order to be able to make available a defined sliding movement between the sliding lip on the one hand and the sliding surface on the other hand. Here, the sliding surface can either be part of the sealing surface, adjoin the sealing surface or else be formed as a separate component on the spoiler body.

Moreover, in embodiments of the present invention, the sealing surface has a stop for the sealing lip. Such a stop serves to make available a defined end position in order to form as it were a mechanical stop function. In other words, the sealing lip will now butt against this mechanical stop at least at the end position, that is to say at the last-possible extended position of the spoiler body, and this end position will thus be reached in a defined manner. The opposite side or the opposite surface of such a stop can be aerodynamically designed in order to be able to allow a transfer of the air flow via the sealing element for example to the spoiler surface. A stop, for example in the form of a downward projection, makes it possible to hold the sealing lip in a defined manner in this end position and thus to avoid a crossover or an undesired further movement of the sealing lip and thus a reduction of the sealing effect.

Moreover, in embodiments of the present invention, the sealing means has a sealing wall and the spoiler body has a complementary sealing wall, wherein the sealing wall and the complementary sealing wall overlap one another in a planar manner at a distance apart in the course of the extension movement. During the extension movement, a relative movement occurs between the complementary sealing wall and the sealing wall. Whereas, for example, the complementary sealing wall and the sealing wall can contact one another in one or in a plurality of end positions, they are at a distance apart in the course of the extension movement. However, a planar overlapping will occur in the direction of the gap which then opens between the sealing wall and the complementary sealing wall, with the result that a labyrinth as it were is formed for an air flow which might penetrate into this gap. The air flow does not usually flow through such a labyrinth, and the latter can be designed and defined beforehand in terms of the flow functionality such that, in spite of a lack of direct contacting, the desired sealing functionality is ensured. Of course, such an embodiment of the sealing means can in principle also be combined with a direct contacting according to the above explanation. The design of such a labyrinth makes it possible, even with small gaps, to achieve an aerodynamic effect which substantially matches that of a complete sealing. Here, high accuracies or elastic materials for the sealing means can be substantially completely avoided.

In embodiments of the present invention, the spoiler body is designed as a rear spoiler of the vehicle. This is a preferred embodiment in which the advantages according to embodiments of the invention manifest themselves particularly clearly. Of course, however, a spoiler system can also have spoiler bodies which make available the desired spoiler functionality with the desired sealing function according to embodiments of the invention at different positions of the vehicle.

Embodiments of the present invention provide methods for moving a spoiler body of a spoiler system by means of an extension movement from a retracted position into at least one extended position, comprising the following steps: beginning the extension movement from the retracted position, sealing a spoiler receptacle with respect to the spoiler body with a sealing means of a sealing device against a sealing surface of the spoiler body during the extension movement, ending the extension movement on reaching an extended position.

In a method according to the invention, the same advantages are achieved as have been explained extensively with reference to a spoiler system according to the invention.

A spoiler system 10 according to the present invention is formed, as shown in FIG. 1, in particular by the combination of a spoiler body 20 and a sealing device 40. Here, the spoiler body 20 is provided with an aerodynamically active spoiler surface 22 which comes into direct contact with the air flow around the vehicle and positively influences it in a desired manner. FIG. 1 here shows a retracted position EP in which this influencing by the spoiler surface 22 is reduced to a minimum and the spoiler surface 22 merges in particular into the adjoining surfaces of the vehicle. It can already be seen clearly here how the sealing device 40 ensures a sealing functionality below the spoiler body 20 of the spoiler system 10. This sealing functionality is explained in more detail in particular with reference to FIG. 2.

Figure 2:
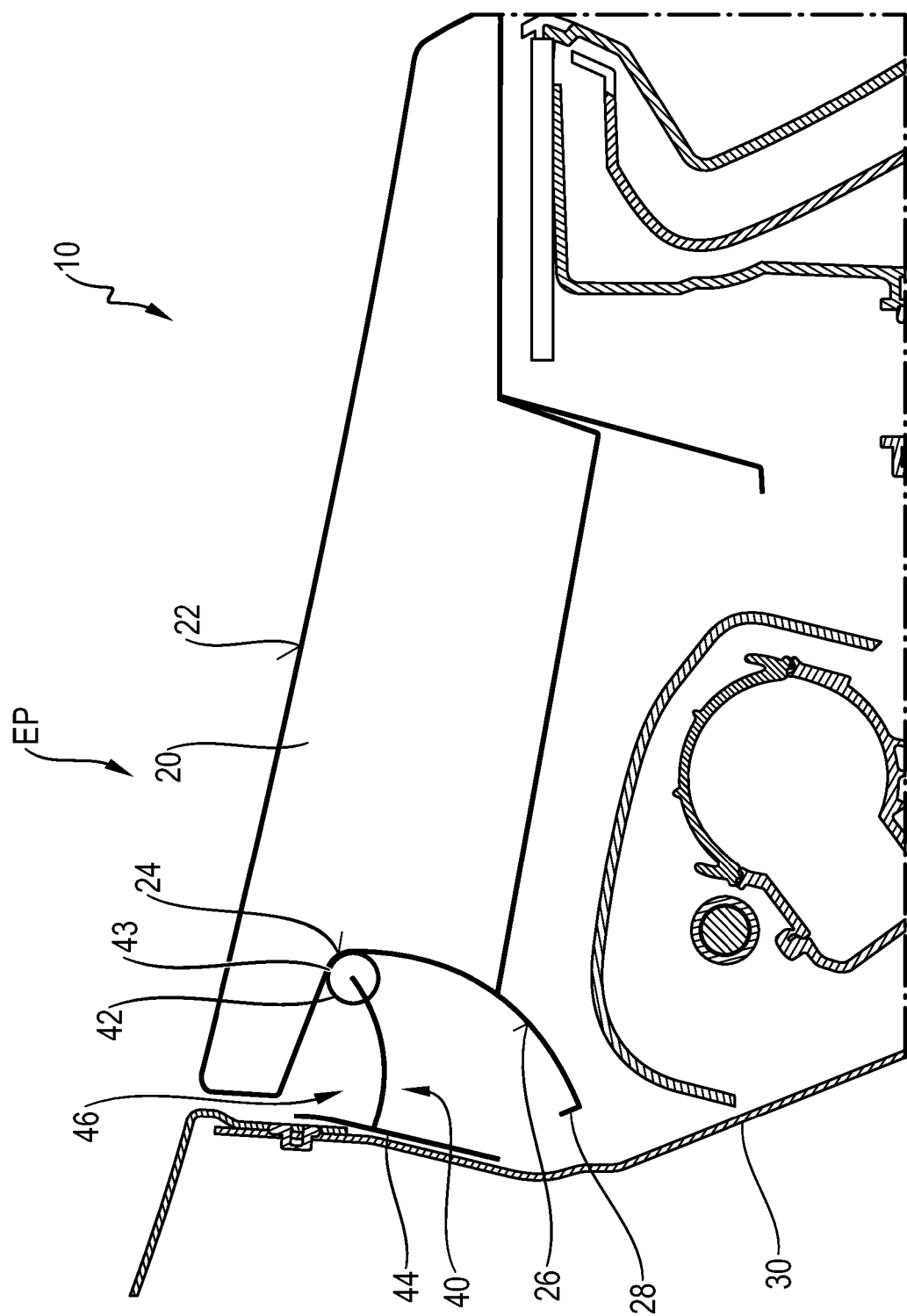
FIG. 2 shows a cross-section of the embodiment of FIG. 1.
Figure 3:
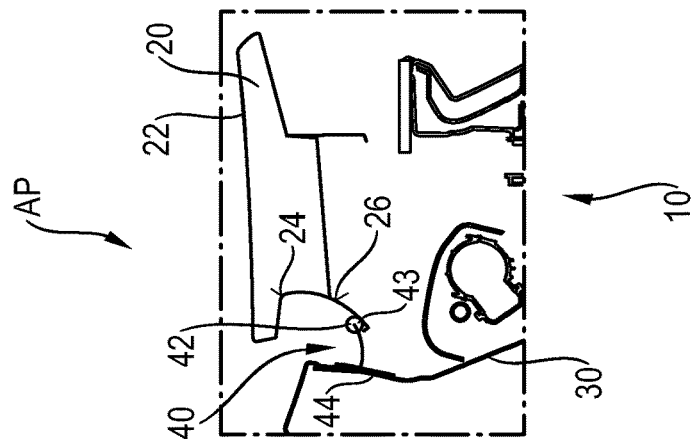
FIG. 3 shows the embodiment of FIGS. 1 and 2 in a retracted position.
Figure 4:
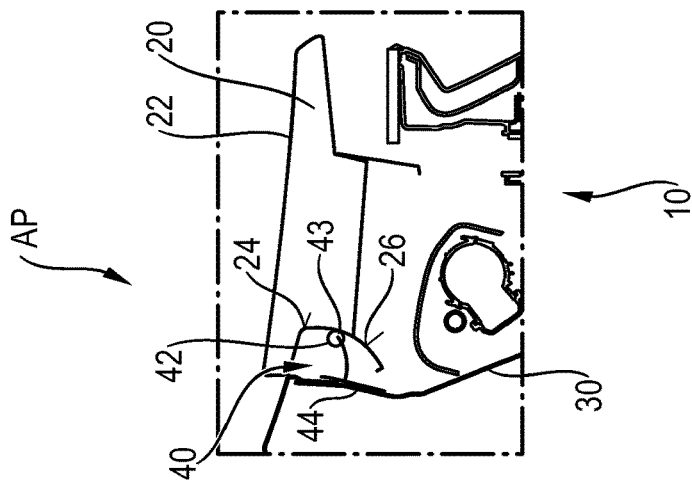
FIG. 4 shows the illustration of FIG. 3 in a first extended position.
Figure 5:
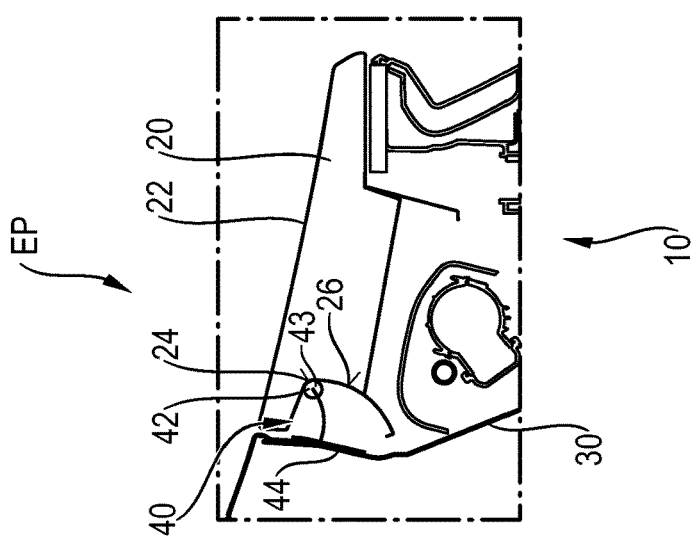
FIG. 5 shows the embodiment of FIGS. 3 and 4 in a second extended position.

FIG. 2 shows a cross section through the spoiler system 10, and it can be seen clearly here which technical components are situated below the spoiler surface 22 of the spoiler body 20. Thus, the spoiler body 20 is equipped here with a sealing surface 24 in which a sealing means 42 in the form of a sealing lip 43 of the sealing device 40 already bears in the retracted position EP. Moreover, a carrier part 44, which is here fastened to the spoiler receptacle 30 so as to be fixed to the vehicle body, makes available a water guide 46 in a dish-shaped manner for discharging surface water. As shown in FIG. 2, a sealing extension extends outwards from the carrier part 44 towards the sealing surface 24 and extends lengthwise to correspond to the lengthwise extension of the sealing surface 24, the sealing lip 43 is at a sealing surface-facing end of the sealing extension, and the sealing lip 43 contacts the sealing surface 24 to provide the sealing effect. As shown in FIGS. 3-5, the curved shape of each of the sealing extension and the sliding surface 26 are complementarily configured such that the sealing slip lip 43 stays in contact with the sliding surface 26 when the spoiler moves. As shown in FIG. 2, the sealing extension includes the water guide 46.

In order that now, even during a movement, sealing can be made available from a retracted position EP into one or more extended positions AP, a sliding surface 26 and an associated stop 28 can be seen here. The individual movement steps are explained in more detail below with reference to FIGS. 3 to 5.

Different positions of the spoiler body 20 relative to the spoiler receptacle 30 can be seen in FIGS. 3 to 5. FIG. 3 here shows a retracted position EP, whereas FIGS. 4 and 5 show extended positions AP. FIG. 4 here shows an intermediate position which can also be referred to as an ecoposition. The illustration according to FIG. 5 is in particular an end position constituting an extended position AP which can be made available for maximum downforce.

The extension movement thus now leads the spoiler body 20 from the illustration according to FIG. 3 into the position according to FIG. 5. During this movement, that is to say the extension movement, the sealing means 42 in the form of the sealing lip 43 slides on the sliding surface 26 of the spoiler body 22. In other words, during the extension movement, the sealing lip 43 of the sealing means 42 is now in sealing contact with the sliding surface 26 and, via this sliding surface, now also makes available the sealing surface 24. In other words, air flow which might penetrate below the spoiler surface 22 into the spoiler receptacle 30 can no longer reach there, since the sealing functionality of the sealing means 42 effectively prevents this.

Figure 6:
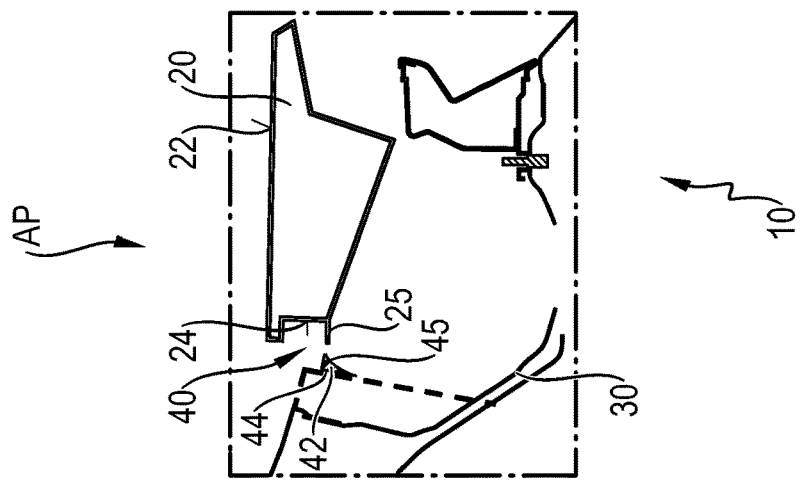
FIG. 6 shows a spoiler system according to a further embodiment of the invention in a retracted position.
Figure 7:
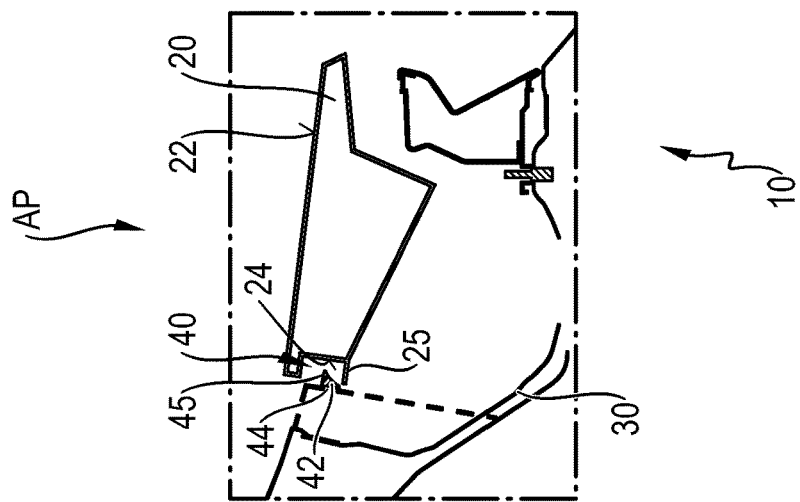
FIG. 7 shows the embodiment of FIG. 6 in a first extended position.
Figure 8:
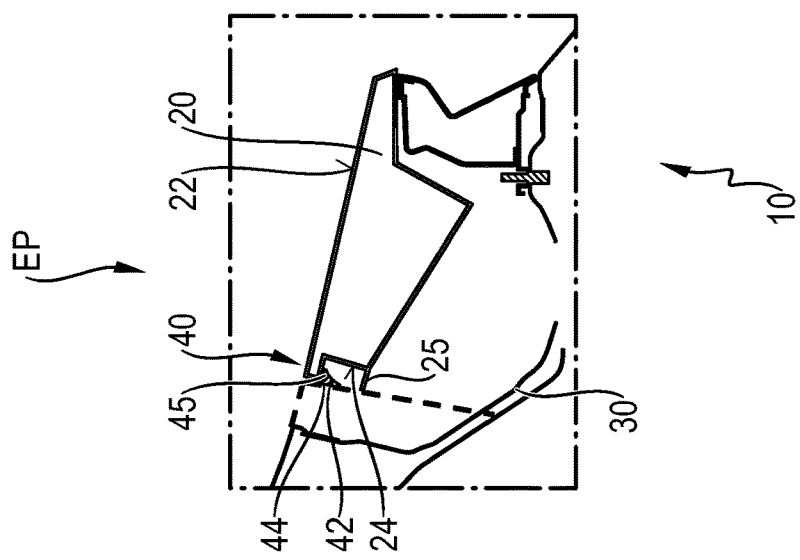
FIG. 8 shows the embodiment of FIGS. 6 and 7 in a second extended position.

FIGS. 6 to 8 show an alternative embodiment in which, in the case of the spoiler system 10, the sealing device 40 is now designed with a residual gap. Here, the sealing means 42 does now not come into contact or only partially into contact with an associated sealing surface 24. Rather, the sealing means 42 is here designed with a sealing wall 45 which, in particular in the intermediate position as extended position AP according to the embodiment variant illustrated in FIG. 7, constitutes a planar overlap, with the result that the labyrinth can now be seen between the sealing wall 45 and the complementary sealing wall 25 of the spoiler body 20 in this side view. Air flow which, in this extended position AP according to FIG. 7, now penetrates into this gap which forms is prevented from penetrating further into the spoiler receptacle 30 by means of the labyrinth between the complementary sealing wall 25 and the sealing wall 45. The residual gap, as is illustrated in the extended position AP according to FIG. 8, is also still provided with a labyrinth functionality such that, here too, the air flow cannot penetrate further into the spoiler receptacle 30 or only in a minimum manner or without disadvantageous aerodynamic effect.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A spoiler system for a vehicle, comprising:
a spoiler body having a spoiler surface for influencing an air flow around the vehicle; and
a spoiler receptacle having a sealing device with a seal configured to provide sealing between the sealing device and a sealing surface of the spoiler body during an extension movement of the spoiler body from a retracted position into an extended position,
wherein the spoiler body is movably mounted on the spoiler receptacle between the retracted position in which the spoiler body is received at least partially in the spoiler receptacle and the extended position in which the spoiler body is extended at least partially out of the spoiler receptacle,
wherein the seal has a sealing lip for sealingly contacting the sealing surface of the spoiler body during the extension movement
wherein the spoiler body has, adjoining the sealing surface, a sliding surface for the sealing lip to slide along during the extension movement.

2. The spoiler system as claimed in claim 1, wherein the sealing device includes a carrier part which is fixed to a vehicle body and which has a water guide configured to discharge water.

3. The spoiler system as claimed in claim 1, wherein the seal is connected in a form-fitting manner to a carrier part of the sealing device.

4. The spoiler system as claimed in claim 1, wherein the seal has a hollow-chamber profile at least in certain portions.

5. The spoiler system as claimed in claim 1, wherein the sealing surface has a stop for the sealing lip.

6. A spoiler system for a vehicle, comprising:
a spoiler body having a spoiler surface for influencing an air flow around the vehicle; and
a spoiler receptacle having a sealing device with a seal configured to provide sealing between the sealing device and a sealing surface of the spoiler body during an extension movement of the spoiler body from a retracted position into an extended position,
wherein the spoiler body is movably mounted on the spoiler receptacle between the retracted position in which the spoiler body is received at least partially in the spoiler receptacle and the extended position in which the spoiler body is extended at least partially out of the spoiler receptacle, and
wherein the seal comprises a sealing wall and the sealing surface has a complementary sealing wall, wherein the sealing wall and the complementary sealing wall overlap one another in a planar manner at a distance apart in the course of the extension movement to form a labyrinth to provide the sealing.

7. The spoiler system as claimed in claim 1, wherein the spoiler body is designed as a rear spoiler of the vehicle.

8. A method for moving a spoiler body of a spoiler system, via an extension movement from a retracted position into an extended position, the method comprising:
beginning the extension movement from the retracted position,
sealing a spoiler receptacle with respect to the spoiler body with a seal of a sealing device against a sealing surface of the spoiler body during the extension movement, and
ending the extension movement on reaching the extended position,
wherein the seal has a sealing lip for sealingly contacting the sealing surface of the spoiler body during the extension movement
wherein the spoiler body has, adjoining the sealing surface, a sliding surface for the sealing lip to slide along during the extension movement.

9. The spoiler system as claimed in claim 1,
wherein when the spoiler body is in the retracted position, the spoiler surface adjoins a surface of a vehicle body,
wherein when the spoiler body is in the extended position there is a gap between the spoiler body and the surface of the vehicle body,
wherein a sealing effect provided by the seal inhibits air flow that enters the gap from further penetrating into the spoiler receptacle.

10. The spoiler system as claimed in claim 9,
wherein the sealing surface of the spoiler body is at a front side of the spoiler body that faces the sealing device, the sealing surface extending lengthwise along the front side and extending widthwise into the sealing receptacle,
wherein the sealing device comprises:
a carrier part that is fixed to the vehicle body in the spoiler receptacle, the carrier part facing the spoiler body, and
a sealing extension that extends outwards from the carrier part towards the sealing surface and extends lengthwise to correspond to the lengthwise extension of the sealing surface, and
wherein the sealing lip is at a sealing surface-facing end of the sealing extension, the sealing lip contacting the sealing surface to provide the sealing effect.

11. The spoiler system as claimed in claim 10,
wherein the sealing lip is configured to contact a sliding surface of the sealing surface to provide the sealing,
wherein the sealing lip is configured to slidably move along the sliding surface when the spoiler moves from the retracted position to the extended position.

12. The spoiler system as claimed in claim 11,
wherein the sealing extension has a curved shape and extends from the carrier part toward an external opening of the spoiler receptacle,
wherein the sliding surface has a curved shape and extends from the spoiler body in a direction toward the front side of the spoiler body and a bottom part of the spoiler receptacle,
wherein the curved shape of each of the sealing extension and the sliding surface are complementarily configured such that the sealing lip stays in contact with the sliding surface when the spoiler moves.

* * * * *